United States Patent [19]

Tamura et al.

[11] Patent Number: 5,342,711
[45] Date of Patent: Aug. 30, 1994

[54] RECHARGEABLE BATTERY WITH NONAQUEOUS ELECTROLYTE

[75] Inventors: Hikari Tamura; Shunichi Higuchi, both of Minoo, Japan

[73] Assignee: Agency of Industrial Science & Technology, Tokyo, Japan

[21] Appl. No.: 27,633

[22] Filed: Mar. 8, 1993

[30] Foreign Application Priority Data

Mar. 11, 1992 [JP]  Japan .................................. 4-88072
Mar. 11, 1992 [JP]  Japan .................................. 4-88074

[51] Int. Cl.$^5$ ............................................. H01M 4/52
[52] U.S. Cl. ..................................... 429/197; 429/212; 429/221
[58] Field of Search ........................ 429/197, 212, 221

[56] References Cited

U.S. PATENT DOCUMENTS 4,236,927  12/1980  Bühl et al. ..................... 429/221 X
4,356,101  10/1982  Jackovitz et al. ............... 429/221 X

FOREIGN PATENT DOCUMENTS 1174274  9/1984  Canada ............................. 429/221
56-103869  8/1981  Japan ................................ 429/212

Primary Examiner—Stephen Kalafut
Attorney, Agent, or Firm—Nikaido, Marmelstein, Murray & Oram

[57] ABSTRACT

The present invention provides a rechargeable battery with a nonaqueous electrolyte, comprising a cathode composite, an anode active material and a nonaqueous electrolyte, the cathode composite containing as a cathode active material an aniline-containing amorphous FeOOH having a density of 2.2 to 2.4 g/cm$^3$ in the form of a powder and showing peaks similar to those derived from $\gamma$-FeOOH at 2$\theta$ of 14°, 27° and 44° as analyzed by X-ray diffractometry with CuK$\alpha$ radiation, the anode active material comprising a lithium ion doped compound, the nonaqueous electrolyte comprising a solution prepared by dissolving a fluorine compound selected from the group consisting of lithium hexafluoroarsenate, lithium hexafluorophosphate and lithium trifluoromethanesulfonate in a solvent mixture comprising ethylene carbonate and an ethereal solvent in a volume ratio of 2:1 to 1:2 in a concentration of 1.0 to 1.5 mol/dm$^3$.

2 Claims, 3 Drawing Sheets

(Transferred Electron Number per One Iron Atom e/Fe %)

RECHARGEABLE BATTERY WITH NONAQUEOUS ELECTROLYTE

BACKGROUND OF THE INVENTION

The present invention relates to a rechargeable battery with a nonaqueous electrolyte, and more particularly to a rechargeable battery with a non-aqueous electrolyte, comprising a cathode composite containing an iron compound having a particular property as a cathode active material, an anode material of a lithium ion doped compound and a non-aqueous electrolyte obtained by dissolving a fluorine compound in a solvent mixture of ethylene carbonate with an ether solvent.

In recent years, a rechargeable lithium battery having a high energy density has attracted attention, which has led to proposals of various compounds as the cathode material and examination of properties of these compounds.

Rechargeable batteries containing, as the cathode active material, lamellar compounds of a transition metal chalcogenide, such as titanium disulfide or molybdenum disulfide, have hitherto been commercialized.

These lamellar compounds, however, have not developed into wide use.

This is because the potential that batteries made with use of the above material can discharge is so low that the energy density can hardly be enhanced, the amount of natural resources of the material is limited, and so forth.

On the other hand, when a metallic lithium is used as the negative electrode, there occurs a problem of a short cycle life of the battery due to the occurrence of dendrite formation, etc.

In order to solve this problem, alloys, carbonaceous materials, etc., have come to be used as the negative electrode material.

This, however, requires the use of a material having a high discharge voltage also on the side of the cathode because any improvement in the energy density of the battery as a whole cannot be attained without use of such a material, so that the development of a cathode active material comprising a metal oxide material has been put forward.

In general, rechargeable batteries wherein use is made of lithium are expected as a power source for portable electronic equipment, a high performance battery for a dispersed-type battery energy storage system of electric automobiles as means for alleviating environmental problems, etc.

In order to spread the rechargeable lithium battery as a practical battery in the above-described applications, the rechargeable lithium battery should satisfy the following requirements: (a) the safety is high; (b) the resource reserve of the material used should be so high that the cost is low; and (c) the cycle life is long.

However, when a lithium-cobalt composite oxide or other material having a high discharge voltage of which the development is presently put forward is used, an oxidative degradation of a solvent in the nonaqueous electrolyte often occurs in a region where the potential exceeds 4 V, so that there is a possibility that bursting of the battery or other unfavorable phenomenon will occur if the battery is overcharged.

Further, metals such as cobalt and lithium are expensive, and the reserve thereof is not abundant.

Further, regarding the service life as well, since composite oxides such as lithium-cobalt are a crystalline material, it is conceivable that there will occur a lowering in the service life of the battery due to the disintegration of crystals accompanying the incorporation and release of lithium ions.

The present inventors previously developed a rechargeable battery with a nonaqueous electrolyte comprising as a cathode active material an aniline-containing amorphous FeOOH produced by reacting iron oxychloride (FeOCl) with aniline and as an electrolyte a propylene carbonate containing lithium tetrafluoroborate ($LiBF_4$) dissolved therein in a concentration of 1.0 mol/dm$^3$.

In this battery, however, the degradation of the discharge capacity was observed even at a relatively early cycle.

The stability of the electrolyte is also a factor having an influence on the cycle life and is related also to the safety of the battery.

However, it was found that the above-described electrolyte has drawbacks such that the anions of $LiBF_4$ as the solute were liable to be decomposed by water as an impurity.

SUMMARY OF THE INVENTION

An object of the present invention is to enhance the safety of a rechargeable battery with a nonaqueous electrolyte comprising an aniline-containing amorphous FeOOH as a cathode active material and, at the same time, to improve the cycle life thereof.

The above-described object of the present invention can be attained by a rechargeable battery with a nonaqueous electrolyte, comprising a cathode composite, an anode active material and a nonaqueous electrolyte, said cathode composite containing as a cathode active material an aniline-containing amorphous FeOOH having a density of 2.2 to 2.4 g/cm$^3$ in the form of a powder and showing peaks similar to those derived from $\gamma$-FeOOH at $2\theta$ of 14°, 27° and 44° as analyzed by X-ray diffractometry with CuK$\alpha$ radiation, said anode active material comprising a lithium ion doped compound, said nonaqueous electrolyte comprising a solution prepared by dissolving a fluorine compound selected from the group consisting of lithium hexafluoroarsenate, lithium hexafluorophosphate and lithium trifluoromethanesulfonate in a solvent mixture comprising ethylene carbonate and an ether in a volume ratio of 2:1 to 1:2 in a concentration of 1.0 to 1.5 mol/dm$^3$.

DESCRIPTION OF THE PREFERRED EMBODIMENTS

Figure 1:
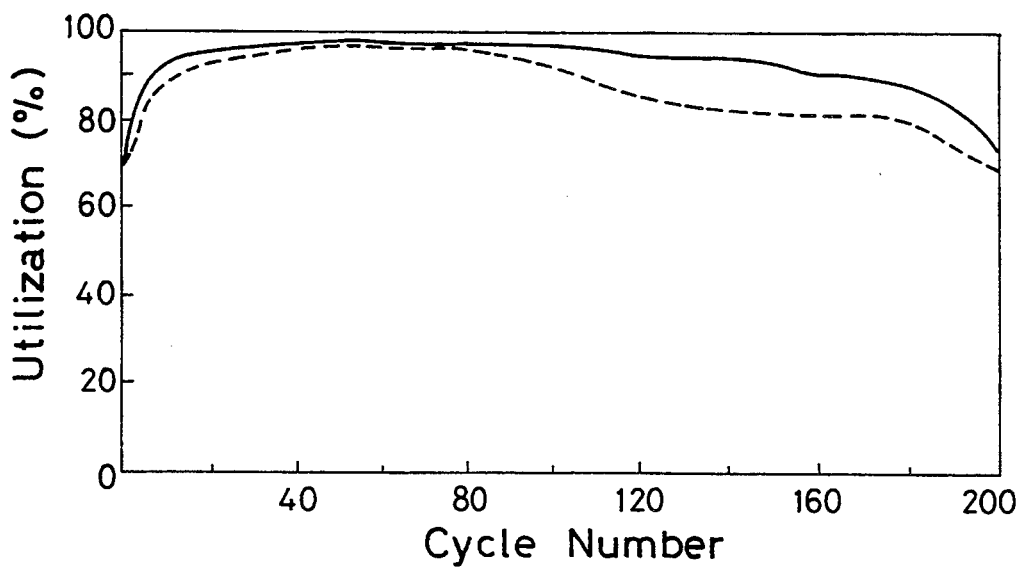
FIG. 1 is a graph showing the results (utilization) of a long life cycling test of batteries prepared in Example 1 and Comparative Example 1.

The rechargeable battery with a nonaqueous electrolyte according to the present invention comprises a cathode composite containing a cathode active material, an anode active material and a nonaqueous electrolyte.

For the cathode active material, useful is aniline-containing amorphous FeOOH. This active material is low in crystallinity has a density of 2.2 to 2.4 g/cm$^3$ in the form of a powder and shows weak peaks similar to those derived from $\gamma$-FeOOH at $2\theta$ of 14°, 27° and 44° as analyzed by X-ray diffractometry with CuK$\alpha$ radiation.

The cathode active material can be produced by mixing iron oxychloride (FeOCl) with aniline in a molar ratio of 4:1 and stirring the mixture in water at 25° to 35° C.

Since this active material is inherently amorphous, there is little influence of a change in the structure during use.

The cathode composite can be prepared by incorporating suitable amounts of a conductive agent (for example, a carbonaceous material such as acetylene black or carbon black) and a binder (for example, a polytetrafluoroethylene (PTFE) powder or a polyethylene powder) into a cathode active material (hereinafter simply referred to as the a-FeOOH(An)) and molding the mixture.

In the present invention, a lithium ion doped compound is used as the anode active material.

The lithium ion doped compound is one produced by incorporating lithium into a carbonized or graphitized carbonaceous material produced by heat-treating pitch-based carbon, petroleum coke or the like at a suitable temperature of about 800° to 2800° C., or a metal or alloy alloyable with lithium.

The method for producing the anode active material includes, though not limited to, the following ones.

(a) When use is made of a carbonaceous material produced in a powdery form, the anode active material is produced by incorporating suitable amounts of a binder, etc., into the carbonaceous material and electrochemically doping the mixture with lithium in a similar electrolyte to that used in batteries at a suitable current density (for example, about 0.3 to 5 mA.cm$^{-2}$) by making use of metallic lithium as a counter electrode until the composition calculated from the quantity of electricity approaches C$_6$Li and the potential to the lithium metal falls within 20 mV.

(b) When use is made of a material, such as a metal or an alloy, produced in a form other than the powder, it is stamped into a suitable form, and when the material per se contains lithium, it is used as the anode active material as such.

(c) In the above method (b), when the material does not contain lithium, the material as stamped is treated in a similar manner to that described in the method (a) to provide an anode active material.

The nonaqueous electrolyte used in the present invention is a solution prepared by dissolving a fluorine compound selected from the group consisting of lithium hexafluoroarsenate (LiAsF$_6$) , lithium hexafluorophosphate (LiPF$_6$) and lithium trifluoromethanesulfonate in a solvent mixture comprising ethylene carbonate (hereinafter simply referred to as "EC") and an ether (in a volume ratio of about 2:1 to 1:2) in a concentration of 1.0 to 1.5 mol/dm$^3$. Examples of the ether include 2-methyltetrahydrofuran, tetrahydrofuran and 1,2-dimethoxyethane.

When the mixing ratio of EC to the ether of the solvent is outside the above-described range, the electric conductivity is reduced.

The electric conductivity is reduced also when the concentration of LiAsF$_6$, LiPF$_6$ or lithium trifluoromethanesulfonate is outside the above-described range.

The cathode composite, containing a cathode active material, and the anode active material are arranged with a separator put therebetween and the assembly is filled with the nonaqueous electrolyte to provide the rechargeable battery of the present invention.

A porous polypropylene film is used as the separator.

The following effects can be attained by the rechargeable battery of the present invention wherein use is made of a combination of a cathode composite containing a particular cathode active material with an anode active material and an electrolyte.

(1) Even when the battery is overcharged at least 3 times as much, the voltage of a flat portion conceivably formed by the oxidation of the residual organic material in the cathode active material is around 4.2 to 4.5 V, so that the potential does not reach the decomposition potential and there is no fear of the battery being burst by the decomposition of the electrolyte.

(2) Since a large discharge capacity per mole of iron is possible, it is possible to provide a rechargeable battery having a weight energy density as high as about 1 Wh.g$^{-1}$ for the cathode active material alone as calculated from the polarization curve of discharge at a low discharge rate, despite the fact that the discharge potential is lower than that of the lithium-cobalt composite oxide.

(3) The polarization during discharge and charge is so small that the battery is stable, which contributes to an improvement in the energy density of the battery as a whole.

(4) An improvement in the cycle life can be attained.

(5) Therefore, the present invention makes it possible to provide a rechargeable battery with a non-aqueous electrolyte having a high practicability.

Examples of the present invention will now be described.

EXAMPLE 1

LiAsF$_6$ was dissolved in a solvent mixture comprising EC and 2-methyltetrahydrofuran (hereinafter referred to as "2-MeTHF") in a volume ratio of 1:1 in a concentration of 1.0 mol/dm$^3$ to prepare an electrolyte.

Separately, the a-FeOOH (An), acetylene black as a conductive agent and PTFE as a binder were kneaded with each other in a weight ratio of 85:10:5 and press-molded under a pressure of 2 ton/cm$^2$ into pellets having a diameter of 16 mm to provide a cathode composite.

Separately, a pitch-based carbonaceous material heat-treated at a suitable temperature was kneaded with 3% by weight, based on the carbonaceous material, of PTFE and press-molded under a pressure of 2 ton/cm$^2$ into pellets having a diameter of 16 mm, which were electrochemically doped with lithium by making use of metallic lithium as a counter electrode in the above-described electrolyte at a current density of 1 mA.cm$^{-2}$ until the composition calculated from the quantity of electricity approached C$_6$Li and the potential to the lithium metal fell within 20 mV to provide an anode active material. In this case, the weight of the anode active material was determined in such a manner that the capacity of the anode was in large excess of the discharge capacity of the cathode.

The cathode composite and anode active material thus obtained were arranged with a separator made of a porous polypropylene film put therebetween, and placed together with the electrolyte in a battery case having a current collector at the bottom thereof to provide a coin-type cell (CR2016) having a capacity of 36.5 mAh, assuming that, in cathode capacity regulation, the number of transferred electrons was one per mole of irons.

The resultant cell was discharged and charged at room temperature under load conditions of a current value of 2 mA and 2 to 4.2 V. The results of the long life cycling test are shown by a solid line in each of FIGS. 1 and 2.

The utilization was determined by supposing the utilization in the case of a capacity of 36.5 mAh to be 100%.

The coulombic efficiency was determined by calculating the ratio of the discharge capacity to the charge capacity in the cycle.

Figure 3:
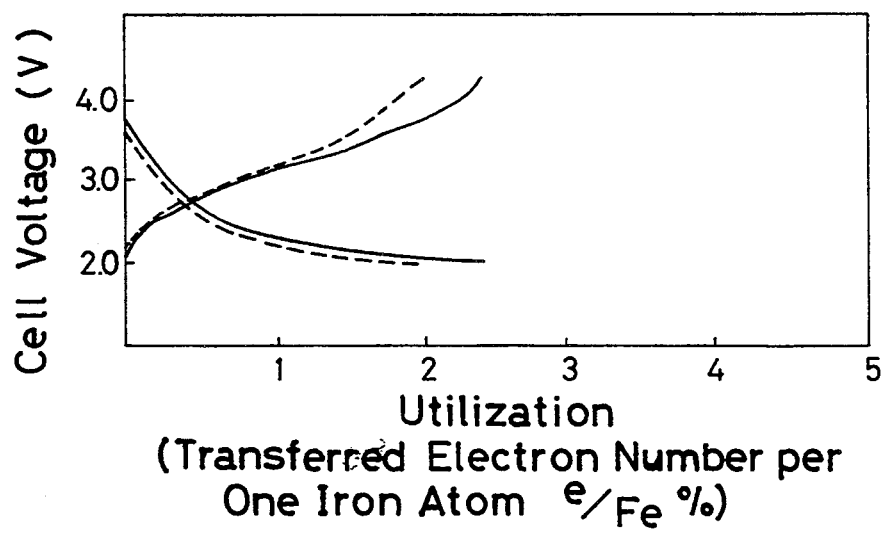
FIG. 3 is a graph showing discharge and charge properties in the 5th cycle of a cycling test for batteries prepared in Example 1 and Comparative Example 1.

The results in the 5th cycle in the above-described cycling test are shown by a solid line in FIG. 3.

COMPARATIVE EXAMPLE 1

A cell was prepared in a similar manner to that of Example 1, except that a propylene carbonate (hereinafter referred to as "PC") containing LiBF$_4$ dissolved therein in a concentration of 1.0 mol/dm$^3$ was used as the electrolyte.

The resultant cell was discharged and charged at room temperature under load conditions of a current value of 2 mA and 2 to 4.2 V. The results of the long life cycling test are shown by a broken line in each of FIGS. 1 and 2.

The results in the 5th cycle in the above-described cycling test are shown by a broken line in FIG. 3.

Figure 2:
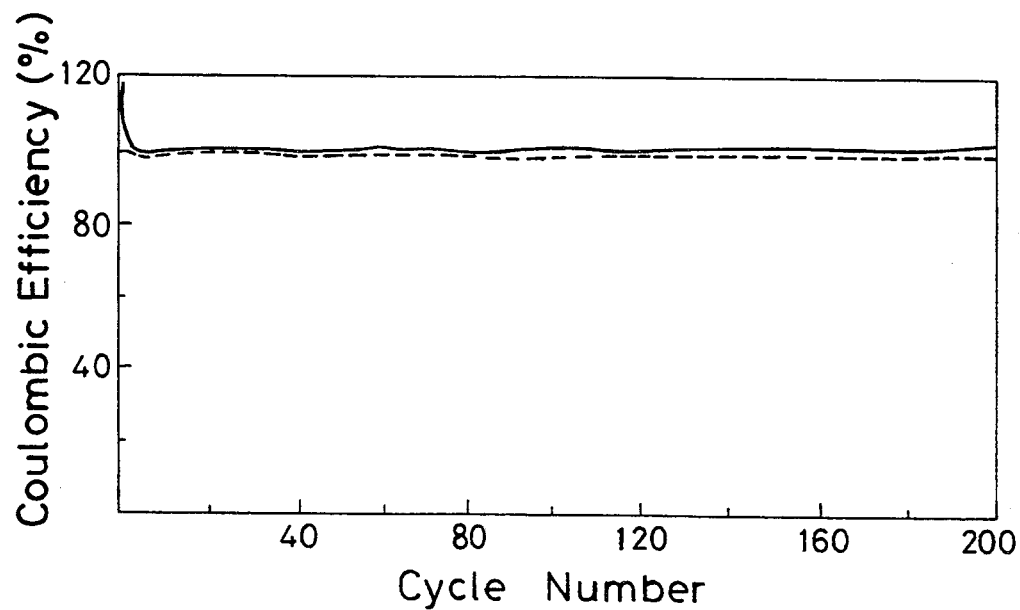
FIG. 2 is a graph showing the results Coulombic efficiency) of a long life cycling test of batteries prepared in Example 1 and Comparative Example 1.

As is apparent from FIGS. 1, 2 and 3, the comparative cell exhibited a lower utilization than that of the cell of the Example from immediately after the initiation of the discharge and charge, and the utilization (75%) at the point of time of the completion of 100 cycles was also inferior to the utilization (90%) in the Example.

Also in the succedding cycles, the utilization of the cell of the Example was about 15% higher than that of the comparative cell.

Regarding the coulombic efficiency as well, the cell of the Example maintained the utilization of 100% until the completion of 200 cycles, which substantiates that the cell of the Example has an improved long life cycling property particularly under a relatively high load condition.

These effects have been attained by combining the a-FeOOH (An) with an electrolyte comprising a combination of an electrolyte containing LiAsF$_6$ having a lower polarization during discharge than that of an electrolyte containing LiBF$_4$ with a solvent mixture comprising EC having a better stability and a lower viscosity than those of PC and 2-MeTHF in a particular volume ratio.

EXAMPLE 2

A rechargeable battery with a nonaqueous electrolyte was prepared in a similar manner to that of Example 1, except that LiPF$_6$ was used instead of LiAsF$_6$. The results were substantially the same as those of Example 1.

EXAMPLE 3

Lithium trifluoromethanesulfonate was dissolved in a solvent mixture comprising ethylene carbonate (hereinafter referred to as "EC") and 2-methyltetrahydrofuran (hereinafter referred to as "2-MeTHF") in a volume ratio of 1:1 in a concentration of 1.0 mol/dm$^3$ to provide an electrolyte.

A cathode composite was prepared from the a-FeOOH (An), acetylene black as a conductive agent and PTFE as a binder in a similar manner to that of Example 1.

Separately, an anode active material was prepared in a similar manner to that of Example 1, and the coin-type cell (CR2016) like that of Example 1 was prepared by making use of the resultant cathode composite, anode active material and electrolyte in a similar manner to that of Example 1.

The resultant cell was discharged and charged at room temperature under load conditions of a current value of 1 mA and 2 to 4.2 V. The results of the long life cycling test are shown by a solid line in each of FIGS. 4 and 5.

Further, the cell was discharged and charged at room temperature under low load conditions of a current value of 1 μA and 2 to 4.2 V. The results in the 5th cycle in the above-described cycling test are shown by a solid line in FIG. 6.

Figure 4:
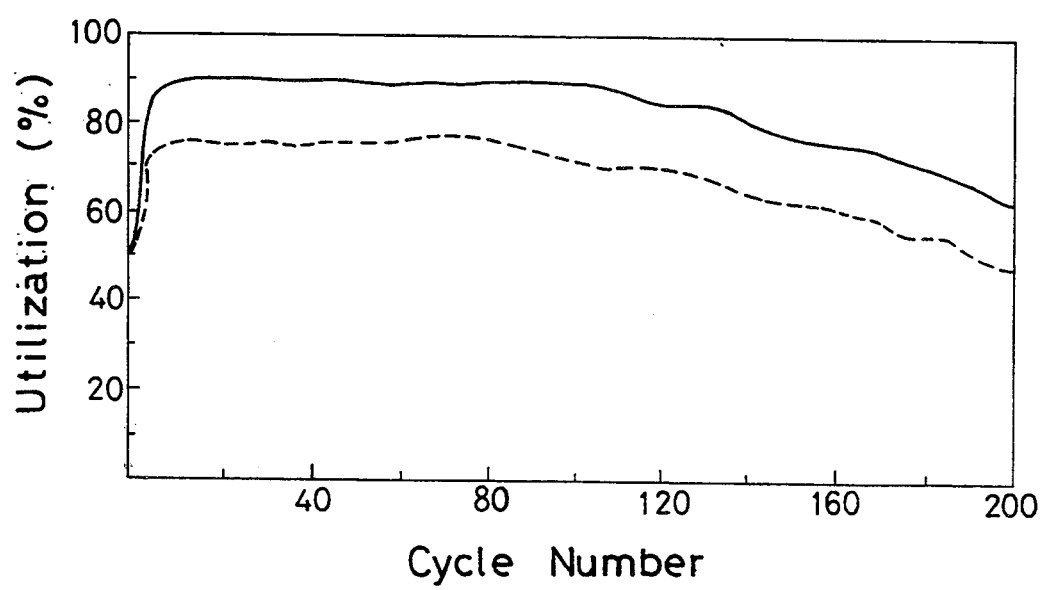
FIG. 4 is a graph showing the results (utilization) of a long life cycling test of batteries prepared in Example 3 and Comparative Example 2.
Figure 5:
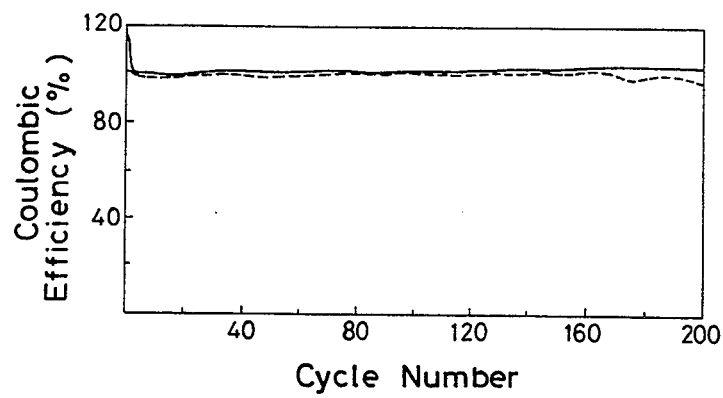
FIG. 5 is a graph showing the results Coulombic efficiency) of a long life cycling test of batteries prepared in Example 3 and Comparative Example 2.
Figure 6:
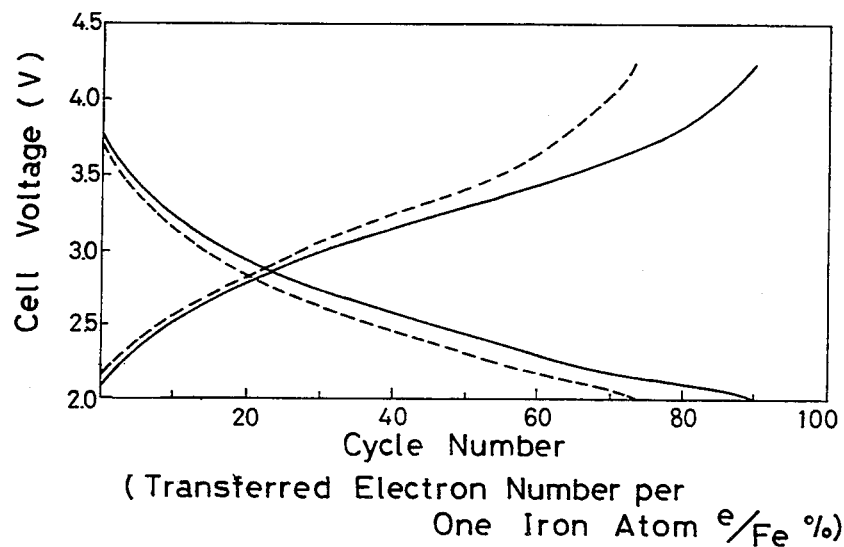
FIG. 6 is a graph showing the results of discharge and charge properties in the 5th cycle of a cycling test in the case where batteries prepared in Example 3 and Comparative Example 2 are discharges and Comparative Example 2 are discharges and charged at room temperature under low load conditions of a current value of 1 μA and 2 to 4.2 V.

As is apparent from the results indicated by the solid line in each of FIGS. 4, 5 and 6, a capacity as high as 88 mAh was obtained under a low load condition, and the weight energy density for the cathode active material alone was 1.3 Wh.g$^{-1}$.

COMPARATIVE EXAMPLE 2

A cell was prepared in a similar manner to that of Example 1, except that a propylene carbonate (hereinafter referred to as "PC") containing LiBf$_4$ dissolved therein in a concentration of 1.0 mol/dm$^3$ was used as the electrolyte.

The resultant cell was discharged and charged at room temperature under load conditions of a current value of 1 mA and 2 to 4.2 V. The results of the long life cycling test are shown by a broken line in each of FIGS. 4 and 5.

Further, the cell was discharged and charged at room temperature under low load conditions of a current value of 1 μA and 2 to 4.2 V. The results in the 5th cycle in the above-described cycling test are shown by a broken line in FIG. 6.

As is apparent from the results indicated by the broken line in each of FIGS. 4, 5 and 6, the cell of the Comparative Example 2 exhibited a lower utilization than that of the cell of the Example 3 from immediately aftr the initiation of the discharge and charge, and the utilization (90%) at the point of time of the completion of 100 cycles was also inferior to the utilization (95%) in the Example 3.

Also in the succeeding cycles, the utilization of the cell of the Example 3 was higher by about 10% than that of the cell of the Comparative Example 2.

Regarding the Coulombic efficiency as well, the cell of the Example 3 maintained the utilization of 100% until the completion of 200 cycles, which substantiates that the cell of the Example 3 has an improved long life cycling property.

Further, also in the discharge and charge under a low load condition, the cell of the Example 3 exhibited a discharge capacity 1.3 times higher than that of the cell of the Comparative Example 2.

These effects have been attained by combining the a-FeOOH (An) with an electrolyte comprising a combination of an electrolyte of lithium trifluoromethanesulfonate having a high stability with a solvent mixture comprising EC having a better stability and a lower viscosity than those of PC and 2-MeTHF in a particular volume ratio.

What is claimed is:

1. A rechargeable battery with a nonaqueous electrolyte, comprising a cathode composite, an anode active material and a nonaqueous electrolyte, said cathode composite containing as a cathode active material a composition comprising an aniline-containing FeOOH having a density of 2.2 to 2.4 $g/cm^3$ in the form of a powder which shows peaks at $2\gamma$ of 14°, 27° and 44° as analyzed by X-ray diffractometry with $CuK\alpha$ radiation, wherein said composition comprises sufficient amorphous FeOOH that its structure does not substantially change during use, said anode active material comprising a lithium ion doped compound, said nonaqueous electrolyte comprising a solution prepared by dissolving a fluorine compound selected from the group consisting of lithium hexafluorarsenate, lithium hexafluorophosphate and lithium trifluoromethanesulfonate in a solvent mixture comprising ethylene carbonate and ether in a volume ratio of 2:1 to 1:2 in a concentration of 1.0 to 1.5 $mol/dm^3$.

2. The battery according to claim 1, wherein said lithium ion doped compound is a carbonaceous material, or a metal or an alloy capable of forming an alloy with lithium, the lithium ion being electrochemically doped in the compound.

* * * * *